United States Patent Office 2,739,156
Patented Mar. 20, 1956

2,739,156

PREPARATION OF ALKYL ISODEHYDROACETATES FROM ALKYL ACETOACETATES USING SULFUR TRIOXIDE DISSOLVED IN SULFURIC ACID AS CONDENSING AGENT

De Walt S. Young and Norman M. Atkins, Kingsport, Tenn., assignors to Eastman Kodak Company, Rochester, N. Y., a corporation of New Jersey No Drawing. Application February 15, 1952, Serial No. 271,853

15 Claims. (Cl. 260—343.5)

This invention relates to the condensation of alkyl acetoacetates to form alkyl isodehydroacetates employing as the condensing agent solutions of sulfur trioxide in substantially anhydrous sulfuric acid.

This invention is related to that disclosed in a copending application Serial No. 218,268, filed March 29, 1951, by J. M. Straley and B. C. Wininger, now U. S. Patent No. 2,607,781, dated August 19, 1952. The Straley et al. specification clearly points out the prior art. Straley et al. disclose and claim condensing alkyl acetoacetates to form alkyl isodehydroacetates employing sulfur trioxide, especially solutions of sulfur trioxide in certain organic solvents which do not interfere with the course of the reaction. The present invention also employs solutions of sulfur trioxide but the solvent is inorganic and is restricted to sulfuric acid; moreover, the concentration of the solution is restricted to a certain advantageous range whereby unexpected results are obtained. Furthermore, the solvent, viz. sulfuric acid, is an active component of the condensing agent. By means of the present invention, side reactions due to the presence of organic solvents as disclosed by Straley et al. are substantially avoided.

The disadvantages of the prior art include low yields of alkyl isodehydroacetate, undesirably large yields of free isodehyroacetic acid which can only be esterified with difficulty, bothersome yields of by-products which may form complexes thereby interfering with good yields of the desired ester, corrosive nature of the condensing agents on the reaction vessel and associated equipment, cost of condensing agents and equipment, extremely long periods of time required to obtain worthwhile yields, etc.

According to the prior art, results have been obtained as illustrated in the following table which compares such results with those obtained by work done in our laboratories including that obtainable according to the instant invention and the above referred to application filed concurrently herewith. Processes A and B result in a good conversion of ethyl acetoacetate to ethyl isodehydroacetate (3) which compares favorably with the prior art processes. The most important point to be noted is the high recovery of ethyl acetoacetate (2) which is several times the recovery obtainable by any of the tabulated prior art processes. Another point of importance is the shortened reaction time for processes A and B compared to the tabulated prior art (however, under high temperatures and pressures, U. S. 2,529,917 discloses equally short reaction periods). Another important point is the high yield obtained based on the ethyl acetoacetate consumed (7) which is markedly greater than any of the other tabulated processes except for that of U. S. 2,529,-917 (Process F). The process of U. S. 2,529,917 has the disadvantage of requiring expensive high pressure equipment accompanied by extensive corrosion problems due to the presence of hydrogen chloride at elevated temperatures and pressures. Other disadvantages of the prior art processes have been referred to above.

ETHYL ACETOACETATE CONVERSION TO ETHYL ISODEHYDROACETATE

| Process [1] | Condensing Agent | Ester Recovery [2] | Conversion to— | | | | Process Time | Yield from Ester used [7] |
|---|---|---|---|---|---|---|---|---|
| | | | Ester [3] | Acid [4] | Lactone [5] | Unaccounted [6] | | |
| | | Percent | Percent | Percent | Percent | Percent | | Percent |
| A | $SO_3$ in $H_2SO_4$ | 39 | 51.8 | [8] 3 | [8] 3 | ca. 3 | 16–18 Hrs | 84.5 |
| B | HCl in $EtHSO_4$ | 45 | 43.5 | [8] 3 | [8] 4 | ca. 4 | 16–18 Hrs | 79 |
| C | $H_2SO_4$ | [11] | 41 | 41 | [11] | [11] | 2 Weeks | 41 |
| D | $H_2SO_4$ | ca. 0 | 38 | 36 | | 24 | 2 Weeks | 38 |
| E | 97% $H_2SO_4$ | ca. 0 | 48 | 13 | | 11 | 2 | 48 |
| F | HCl | 15 | 65 | 6 | [10] 0 | 28 | 72 Hrs | 75 |
| G | HCl | [11] | 63 | [9] | [9] | 3 | 48 Hrs | 63 |
| | | | | | | [11] | 2 Weeks | |

[1] Processes are: A and B are as described in this and the application filed concurrently herewith; C is as described by Hantzsch, Ann., 222, 9; D is as described by Anschutz, Ann., 259, 152; E relates to recent work in our laboratories related to improvements on C and D; F is as described in U. S. 2,529,917 by coworkers; G is as described by Goss et al., J. Chem. Soc. 123, 327.
[2] Percent of ethyl acetoacetate ester starting material recovered or recoverable.
[3] Percent converted to ethyl isodehydroacetate ester.
[4] Percent converted to isodehydroacetic acid.
[5] Percent converted to mesiten lactone.
[6] Percent converted to unidentified byproducts.
[7] Percent yield based on the ethyl acetoacetate ester consumed in the reaction.
[8] The mesiten lactone and the isodehydroacetic acid were not isolated except as an intermediate and a high boiling fraction during separation of the unreacted ethyl acetoacetate ester.
[9] No data was given by Hantzsch or Goss et al.
[10] Mesiten lactone was substantially absent but about 11–12% ethyl chloride was formed.
[11] Hantzsch appears to leave about 18% and Goss et al. appear to leave about 37% of their ethyl acetoacetate starting material unaccounted for; however, it is most probable that the majority of these percentages were converted to undesired byproducts with very little if any of the starting material being recoverable.

We have now discovered a process which is not encumbered by any of these disadvantages. We have found that a particular range of concentrations of sulfur trioxide dissolved in sulfuric acid can be used to promote the self-condensation of esters of acetoacetic acid to form the corresponding esters of isodehydroacetic acid. We have found that by our new process, good yields of the desired isodehydroacetate esters are obtained together with very low yields of the free isodehydroacetic acid; moreover, yields of by-products are similarly low. As a result the reaction mixture from our new process contains the desired ester together with unreacted alkyl acetoacetate in sufficiently large quantity to make it practicable to subject the acetoacetate to a second condensation similar to the original reaction whereby the overall yields are much higher than could be expected from the use of oleum and sulfuric acid according to the prior art. Sulfur trioxide, sulfuric acid and oleum are readily available commercially and their use is not accompanied by inordinate corrosion or handling problems. Furthermore, by using particular solutions of sulfur trioxide in sulfuric acid, free isodehydroacetic acid is not formed in amounts sufficient to result in the solid complex which can be an undesirable by-product when only sulfuric acid is employed. Based on the quantity of alkyl acetoacetate consumed we have obtained yields as high as 86% in accordance with our new process.

The principal reaction which takes place in accordance with our invention can be represented as follows:

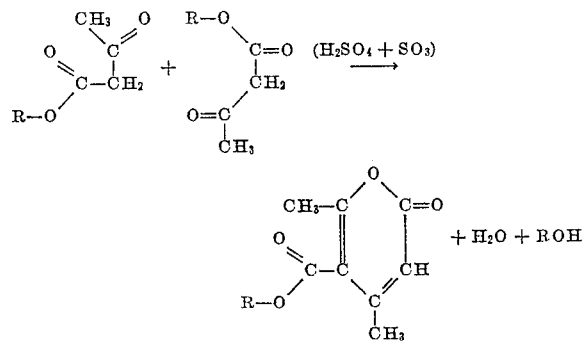

wherein R represents an alkyl radical.

It is an object of our invention to provide an improved process for the manufacture of alkyl esters of isodehydroacetic acid. A further object of our invention is to provide a particularly advantageous condensing agent for employment in the condensation of alkyl esters of acetoacetic acid to form the alkyl esters of isodehydroacetic acid. Other objects will become apparent hereinafter.

In practicing our invention, we have found that while temperatures at least as high as 30° C. may be used, it is more advantageous to use temperatures no higher than room temperatures. It is preferred to employ temperatures, especially during the mixing of the components of the reaction mixture, which are in the range of about −20° to 15° C. Illustrations of the optimum temperatures employable are set forth in the examples described below. Temperatures as low as −20° C. and lower can be employed.

Moisture must be substantially excluded in all condensations performed in accordance with our invention.

Oleum is a solution of sulfur trioxide in sulfuric acid. A readily prepared concentration of sulfur trioxide in sulfuric acid is 65% oleum which is 65% SO₃ and substantially 35% H₂SO₄. By mixing 65% oleum with sulfuric acid, intermediate concentrations can readily be prepared.

It is advantageous to add the condensing agent in a thoroughly premixed condition to an alkyl acetoacetate dropwise with stirring and at a temperature close to zero or lower. This addition can be advantageously conducted over an extended period of time, e. g. from 60 to 200 minutes although there is nothing critical about this as long as the temperature is not permitted to rise unduly. After this mixing operation is completed the stirring can be stopped and the reaction mixture allowed to stand for several hours, e. g. 12–24 hours; however, stirring need not be discontinued if a somewhat more rapid reaction is desired. No more than 24 hours is needed and 18 hours is generally sufficient. However, when the reaction is conducted at or above room temperatures and/or with continuous stirring the period of time should be reduced to avoid undue formation of undesirable products; thus 12 hours under some such circumstances is frequently sufficient.

Upon substantial completion of the condensation, the alkyl isodehydroacetate can be separated by pouring the reaction mixture onto ice or into cold water and adding a non water-miscible solvent such as an aromatic or aliphatic hydrocarbon or halogenated derivative, e. g. benzene, toluene, xylene, carbon tetrachloride, chlorobenzene, etc. The organic layer which forms contains the desired product which can then be separated out by distillation and can be further purified by any suitable means. Other methods of separating the product from the reaction mixture are also clearly possible and can be applied.

The alkyl acetoacetates which can be advantageously employed include methyl, ethyl, and n-propyl acetoacetates. However, any of the lower alkyl esters can be employed. Thus we can employ any of the alkyl acetoacetates, especially those containing from one to six carbon atoms in the alkyl radical, thereby producing alkyl isodehydroacetates which correspond thereto.

The condensing agents employed in accordance with this invention comprise solutions of from at least 5 percent to about 50 percent sulfur trioxide in concentrated sulfuric acid; most advantageously solutions of from about 22 percent to about 42 percent can be employed. The term "sulfuric acid" as employed herein represents substantially pure concentrated sulfuric acid such as that which is normally readily available in commerce. The solutions of sulfur trioxide in sulfuric acid are defined by the percentage of sulfur trioxide by weight in the total weight of the solution of sulfur trioxide in sulfuric acid. Thus, a 50:50 mixture of 65 percent oleum and 97 percent sulfuric acid is approximately equivalent to a 32 percent solution of sulfur trioxide in sulfuric acid. Ethyl isodehydroacetate yields of 73 to 74 percent have been obtained when using as low as 5 percent sulfur trioxide in sulfuric acid. On the other hand, a yield of 70–72 percent was isolated through the use of a 50 percent solution of sulfur trioxide in sulfuric acid.

These condensing agents can readily be prepared by admixing oleum with sulfuric acid. By oleum is meant a commercially available solution of sulfur trioxide in sulfuric acid of sufficient concentration to be used in preparing the condensing agents of this invention in the concentrations specified. The 65 percent oleum will be used in all of the examples since it is readily obtainable. By sulfuric acid is meant substantially anhydrous pure acid such as that commercially available and known as 97 percent sulfuric acid. Advantageously a 50:50 mixture of 65 percent oleum and 97 percent sulfuric acid can be employed as the condensing agent where the 50 parts of each component are by weight. Similarly, other ratios can also be advantageously employed where the proportions are such as to form solutions of from at least 5 percent to about 50 percent sulfur trioxide in sulfuric acid. Sulfuric acid by itself is not effective to accomplish the advantages of this invention since the reaction products obtained contain the free isodehydroacetic acid in undesirably large proportions together with solid complexes and other undesirable by-products. Concentrations of above 50 percent and higher of sulfur trioxide in sulfuric acid are also of inferior effectiveness since the yields obtained in experiments conducted were invariably reduced.

The percent by weight of condensing agent employed based upon weight of the alkyl acetoacetate being condensed is advantageously from about 30 percent to about 80 percent. The optimum percentage is about midway in this range; however, higher and lower percentages can also be employed.

The following examples will serve to further illustrate our invention.

*Example 1*

*First stage.*—780 grams of ethyl acetoacetate was placed in a reaction vessel equipped with an agitator, thermometer, dropping funnel, and a calcium chloride tube for protection from moisture in the air. The temperature was reduced to −5° C. Next, 220.5 grams of 65 percent oleum and 220.5 grams of 97 percent sulfuric acid were mixed together and added dropwise with stirring to the ethyl acetoacetate at about 0° C. over a period of 2½ hours. Agitation was then discontinued and the mixture allowed to stand for 18 hours at from 0° to −5° C. The reaction mixture was then poured into 3 liters of water at below 10° C. After stirring for 20 minutes the product was extracted with benzene, washed with 5% sodium bicarbonate, and the benzene was then removed by distillation. Finally, the crude product was fractionated at 12 mm. Hg pressure yielding 331.8 grams of ethyl acetoacetate (starting material) distilling at 65–70° C. and 285.7 grams of ethyl isodehydroacetate distilling at 150°–176° C. This completed the first stage of the reaction. Based on the acetoacetate consumed, the yield was 84.7%.

*Second stage.*—The 331.8 grams of ethyl acetoacetate recovered was condensed in the presence of 93.5 grams of 65% oleum and 93.5 grams of 97% sulfuric acid in exactly the same manner as in the first stage. From the second stage the yield was 145 grams of ethyl acetoacetate and 115 grams of ethyl isodehydroacetate. Based on the ethyl acetoacetate consumed in both stages, the overall yield was 83.6%.

Based on the total amount of ethyl acetoacetate employed, the overall yield was 68.1%; however, a third stage of the process can be performed on the 145 grams of ethyl acetoacetate recovered from the second stage whereby the overall yield based on the ethyl acetoacetate employed is in the vicinity of 75%. A fourth stage can also be employed if desired.

The various stages of the process as described above can be combined into a continuously operative process if desired.

Example 2

260 grams of ethyl acetoacetate was placed in a reaction vessel. A mixture was made of 73.5 grams of 65% oleum and 73.5 grams of 97% sulfuric acid and this solution was added dropwise, with stirring below 0° C., and with protection from atmospheric moisture. The time for the addition was 85 minutes. Next, the mixture was allowed to stand at from —10° to 0° C. for 16 hours. The reaction mixture was then extracted with benzene, washed with 5 percent sodium bicarbonate, and after removal of the solvent, distilled at 12 mm. of Hg pressure. The ethyl acetoacetate recovered weighed 111.6 grams and 96.9 grams of ethyl isodehydroacetate was obtained which represented a yield of 86.5 percent based on the amount of ethyl acetoacetate consumed. The yield based on the amount of ethyl acetoacetate employed was about 49.5 percent; however, so much of this starting material was recovered that by employing a second and third stage of the process, an overall yield of close to 80 percent can be obtained.

Examples 3 and 4 represent the results obtained at the upper and lower limits of the advantageous range of solution concentrations of sulfur trioxide in sulfuric acid.

Example 3.—(5% solution of $SO_3$)

147 grams of a 5 percent solution of sulfur trioxide in sulfuric acid were prepared by mixing sulfuric acid and oleum at 10°–20° C. and this solution was added dropwise to 260 grams of ethyl acetoacetate with stirring below 0° C. and with protection from atmospheric moisture. The addition time was 6½ hours. The mixture was allowed to stand 12 hours at —10–0° C. and subsequently introduced into an excess of water below 10° C. Finally the product was benzene extracted, washed with 5 percent $NaHCO_3$ and after removal of the solvent, purified by distillation at 12 mm. Hg pressure. Weight of recovered ethyl acetoacetate=107.8 g. Weight of distilled ethyl isodehydroacetate = 84.6 g. Percent yield on basis of ethyl acetoacetate consumed=74%.

Example 4.—(50% solution of $SO_3$)

160 grams of a 50 percent solution of sulfur trioxide in sulfuric acid was prepared and added to 260 grams of ethyl acetoacetate. The reaction was conducted under essentially the same conditions as in Example No. 1. Addition time was 4 hours. The reaction mix was allowed to stand at —10–0° C. for 65 hours. Recovered ethyl acetoacetate=41 g. Distilled ethyl isodehydroacetate = 117.5 g. Yield based on ethyl acetoacetate consumed=71.5 percent.

Examples 5 and 6 represent the results obtained when about 38 percent and about 75 percent, respectively, of the condensing agent is employed, based on the weight of the ethyl acetoacetate being condensed.

Example 5.—(38% of condensing agent)

260 grams of ethyl acetoacetate and 49 grams of 97 percent sulfuric acid mixed with 49 grams of 65 percent oleum were employed. Addition of the condensing agent was at 0–5° C. Allowed to stand 16 hours at —8° C. and worked up by extraction as previously described. Recovered ethyl acetoacetate=97.5 g. Crude ethyl isodehydroacetate=90.5 g. Crude yield=74 percent.

Example 6.—(75% of condensing agent)

260 grams of ethyl acetoacetate and 98 grams of 97 percent sulfuric acid mixed with 98 grams of 65 percent oleum were employed. The condensing agent was added to the ethyl acetoacetate below 0° C. in 3 hours. The reaction mixture was allowed to stand for 16 hours at —8° C. Product and starting material were isolated as previously described. Recovered ethyl acetoacetate = 85.2 g. Distilled ethyl isodehydroacetic ester=99.2 g. Yield based on ethyl acetoacetate consumed = 75 percent.

What we claim as our invention is:

1. A process for preparing an alkly isodehydroacetate comprising condensing an alkyl acetoacetate containing from 1 to 6 carbon atoms in the alkyl group at a temperature of from about —20° to about 30° C. in the presence of a condensing agent consisting of a solution containing from at least 5 percent to about 50 percent of sulfur trioxide dissolved in sulfuric acid.

2. A process as defined in claim 1 wherein the alkyl group is methyl.

3. A process as defined in claim 1 wherein the alkyl group is ethyl.

4. A process for preparing an alkyl isodehydroacetate comprising condensing an alkyl acetoacetate containing from 1 to 6 carbon atoms in the alkyl group at a temperature of from about —20° C. to about 30° C. in the presence of a condensing agent consisting of a solution containing from about 22 percent to about 42 percent of sulfur trioxide dissolved in sulfuric acid.

5. A process as defined in claim 4 wherein the condensing agent is added to the alkyl acetoacetate slowly and with agitation so as to maintain a temperature below about 15° C. and then continuing the condensation for at least 12 hours.

6. A process for preparing an alkyl isodehydroacetate comprising condensing under substantially anhydrous conditions, an alkyl acetoacetate containing from 1 to 6 carbon atoms in the alkyl group by gradually adding a condensing agent to the alkyl acetoacetate so as to maintain a temperature below about 15° C. and then continuing the condensation for at least 12 hours at a temperature below about 30° C., said condensing agent consisting of a solution of from about 22 percent to about 42 percent of sulfur trioxide dissolved in sulfuric acid.

7. A process as defined in claim 6 wherein the alkyl group is methyl.

8. A process as defined in claim 6 wherein the alkyl group is ethyl.

9. A process as defined in claim 6 wherein the reaction mixture obtained upon substantial completion of the condensation is separated so as to recover the unreacted alkyl acetoacetate which is then subjected to a repetition of the process as defined in claim 6 whereby a further quantity of alkyl isodehydroacetate is obtained.

10. A process for preparing an alkyl isodehydroacetate comprising condensing under substantially anhydrous conditions, an alkyl acetoacetate containing from 1 to 6 carbon atoms in the alkyl group by adding a condensing agent to the alkyl acetoacetate slowly and with mixing whereby a temperature below about 10° C. is maintained, and then continuing the condensation for from about 12 to about 24 hours at a temperature below about 20° C., said condensing agent consisting of a solution of from about 22% to about 42% of sulfur trioxide dissolved in sulfuric acid.

11. A process as defined in claim 10 wherein the condensing agent is added in an amount of from about 30% to about 80% by weight of the alkyl acetoacetate to be condensed.

12. A process as defined in claim 11 wherein the condensing agent consists of a solution of about 32% of sulfur trioxide dissolved in sulfuric acid.

13. A process as defined in claim 12 wherein the reaction mixture obtained upon substantial completion of the condensation is separated so as to recover the unreacted alkyl acetoacetate which is then subjected to a repetition of the same condensation reaction as defined in claim 12.

14. A process as defined in claim 13 wherein the alkyl group is ethyl.

15. A process as defined in claim 13 wherein the alkyl group is methyl.

References Cited in the file of this patent

UNITED STATES PATENTS

| | | |
|---|---|---|
| 2,529,917 | Coover et al. | Nov. 14, 1950 |
| 2,607,781 | Straley et al. | Aug. 19, 1952 |